United States Patent
Wei et al.

(10) Patent No.: US 9,429,744 B2
(45) Date of Patent: Aug. 30, 2016

(54) SYSTEM AND METHOD FOR COLOR CORRECTION OF A MICROSCOPE IMAGE WITH A BUILT-IN CALIBRATION SLIDE

(71) Applicant: Datacolor, Inc., Lawrenceville, NJ (US)

(72) Inventors: Hong Wei, Lawrenceville, NJ (US); Michael H. Brill, Kingston, NJ (US)

(73) Assignee: DATACOLOR HOLDING AG, Luzern (CH)

(*) Notice: Subject to any disclaimer, the term of this patent is extended or adjusted under 35 U.S.C. 154(b) by 552 days.

(21) Appl. No.: 13/856,727

(22) Filed: Apr. 4, 2013

(65) Prior Publication Data

US 2014/0300725 A1    Oct. 9, 2014

(51) Int. Cl.
G02B 21/34    (2006.01)
G02B 21/06    (2006.01)
G02B 21/36    (2006.01)
G02B 5/20    (2006.01)

(52) U.S. Cl.
CPC .............. *G02B 21/06* (2013.01); *G02B 5/201* (2013.01); *G02B 21/34* (2013.01); *G02B 21/365* (2013.01)

(58) Field of Classification Search
None
See application file for complete search history.

(56) References Cited

U.S. PATENT DOCUMENTS

| | | | |
|---|---|---|---|
| 5,367,401 A * | 11/1994 | Saulietis | 359/398 |
| 8,385,619 B2 | 2/2013 | Soenksen | |
| 2005/0105789 A1 * | 5/2005 | Isaacs | G06T 7/0004 382/141 |
| 2005/0142654 A1 | 6/2005 | Matsumoto et al. | |
| 2007/0211460 A1 * | 9/2007 | Ravkin | 362/231 |
| 2009/0147355 A1 * | 6/2009 | Jennings | G02B 21/26 359/391 |
| 2010/0202044 A1 | 8/2010 | Nishizaka et al. | |
| 2013/0044200 A1 | 2/2013 | Brill et al. | |
| 2013/0044202 A1 * | 2/2013 | Kajiro | 348/79 |
| 2013/0188035 A1 * | 7/2013 | Goodwin | 348/79 |

OTHER PUBLICATIONS

"Introduction to Micrometry"—Thomas J. Fellers and Michael W. Davidson—National High Magnetic Field Laboratory, 1800 East Paul Dirac Dr., The Florida State University, Tallahassee, Florida. http://web.archive.org/web/20100929041712/http://www.microscopyu.com/articles/formulas/measurements.html (screenshot from Sep. 29, 2010) Accessed: Jan. 6, 2016.*
International Search Report and Written Opinion in PCT Application Serial No. PCT2014/032675, mailed Aug. 19, 2014.
International Preliminary Report on Patentability in corresponding PCT Application No. PCT/US2014/032675, mailed Oct. 15, 2015.

* cited by examiner

*Primary Examiner* — Kevin McInnish
(74) *Attorney, Agent, or Firm* — Leason Ellis LLP (57) ABSTRACT

A system and method are disclosed for correcting the color of microscope images for different illuminants. The system includes a microscope having at least one image setting value selector with a plurality of pre-set positions, and an optical train having a distal end and a proximal end and being configured to convey illumination. The optical train is further configured to allow introduction of a calibration slide into the optical train of the microscope at a plurality of possible positions, each position being a conjugate plane of the sample plane, when the sample is in focus. The calibration slide incorporates an integral transmission filter array of known transmission values.

16 Claims, 7 Drawing Sheets

SYSTEM AND METHOD FOR COLOR CORRECTION OF A MICROSCOPE IMAGE WITH A BUILT-IN CALIBRATION SLIDE

THE INVENTION

The present invention describes a system and method for integrating an image calibration slide into a microscope body. The described system allows for a calibration slide to be automatically inserted into a conjugate field plane of a microscope. As such, the system and method of the present invention eliminate the need to manually switch between the calibration elements and the sample back and forth to perform the color calibration. The system and method of the present invention allow for faster measurement, greater measurement repeatability and more precise calibration. The calibration slide of the present invention contains similar types of reference colors as the stand-alone slide does and is integrated into the microscope at a conjugate plane of the sample plane (i.e., one of the planes within the microscope at which an image from the slide is in focus).

BACKGROUND OF THE INVENTION

Currently, digital imaging has allowed for unprecedented levels of collaboration between technicians, researchers and scientists. In part, this collaboration is due to the relatively inexpensive nature of current digital imaging technology. Image capture devices and associated software platforms combined with improved computer screens and monitors have also allowed for the rapid analysis and review of images where accurate color fidelity is essential. The proliferation of different styles, models and technical complexity of digital imaging technology can be readily seen in the digital microscopy market. In the field of digital imaging, there are many microscope systems that provide custom digital images. Unfortunately, there is no system or method currently available that ensures color accuracy and consistency from one system to another.

Additionally, recording images of hard-to-detail specimens requires diligence. A fortuitous imaging of a sample might not be replicable under subsequent conditions. However, once the image is recorded, modifying it in image editing suites can alter the desired appearance. Therefore, what is needed is the ability to calibrate an image of a sample so as to render the sample in different lighting conditions. Co-owned U.S. patent application Ser. No. 13/211,875 titled "System and Apparatus for the Calibration and Management of Color in Microscope Slides" filed on Aug. 17, 2011, herein incorporated by reference in its entirety, describes the use of color calibrated slides to determine the color values of biological samples under various lighting conditions. However, the system described in the '875 Application does not describe embodiments particular to utilizing a conjugate plane of the sample plane to obtain a precise measurement of the calibration slide without altering any of the microscope or camera settings. Likewise, U.S. patent application Ser. No. 13/594,107 titled "System and Apparatus for Color Correction in Transmission-microscope Slides", filed on Aug. 24, 2012, herein incorporated by reference in its entirety, describes a calibration and evaluation system of images of slides but does not describe the invention provided herein.

Therefore, what is needed is a system and method that provides improved measurement of a calibration slide. In particular, the present system and method reduce the likelihood of damaging the calibration slide or obtaining an imprecise calibration measurement.

SUMMARY OF THE INVENTION

A system and method are described for correcting the color of microscope images for different illuminants. The invention as described details the use of a microscope having at least one image setting selector used to obtain an image of a sample, (e.g. a configurable numerical aperture with a plurality of pre-set positions), and an optical train having a distal end and a proximal end, which is configured to convey illumination. In the invention as described, the optical train is further configured to allow the introduction of a calibration slide into the optical train of the microscope at a plurality of possible positions, each position being a conjugate plane of the sample plane when the sample is in focus. The calibration slide of the present system and method incorporates an integral transmission filter array of known transmission values.

Additionally, the described image-recording system and method records images of the sample slide and the calibration slide, and extracts color value information from the images so as to output a composite image wherein the color values of each pixel have been transformed based on the calibration values.

BRIEF DESCRIPTION OF THE DRAWINGS

The foregoing and other features of the present invention will be more readily apparent from the following detailed description and drawings of illustrative embodiments of the invention in which.

DESCRIPTION OF ILLUSTRATIVE EMBODIMENTS OF THE INVENTION

By way of overview and introduction, the present invention concerns a microscope and calibration slide arrangement in which the calibration slide is introduced into a conjugate plane of the optical train of the microscope so as to obtain precise measurements without altering the settings of the microscope or other imaging device. Specifically, the present system and method are directed to introducing a calibration slide to a microscope optical train in order to obtain highly precise and reproducible transmission spectra values for use in image calibration or conversion software.

Figure 4A:
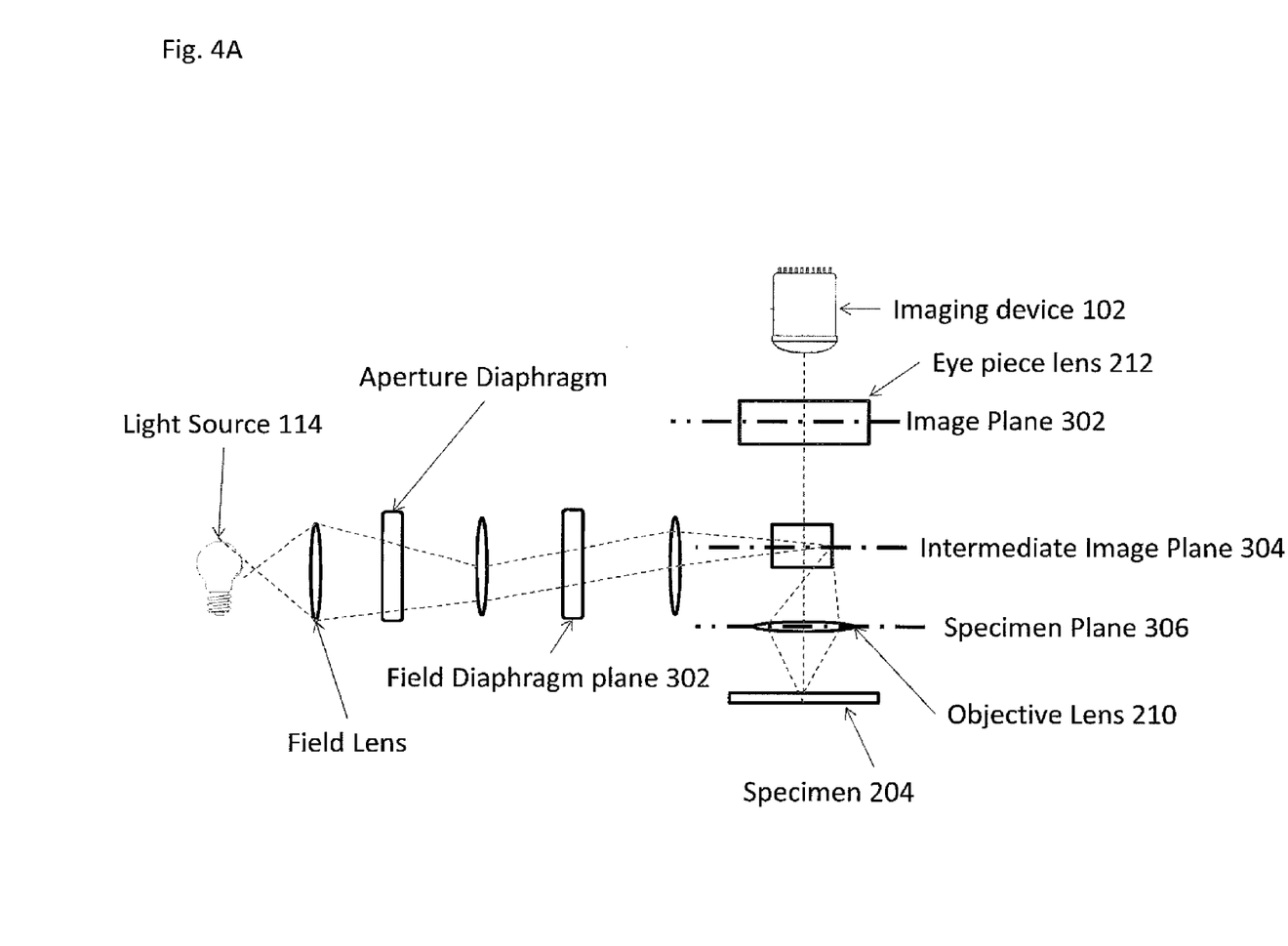
FIG. 4A is an illustrative diagram of the optical train of a reflecting microscope according to a further embodiment of the present invention.
Figure 4B:
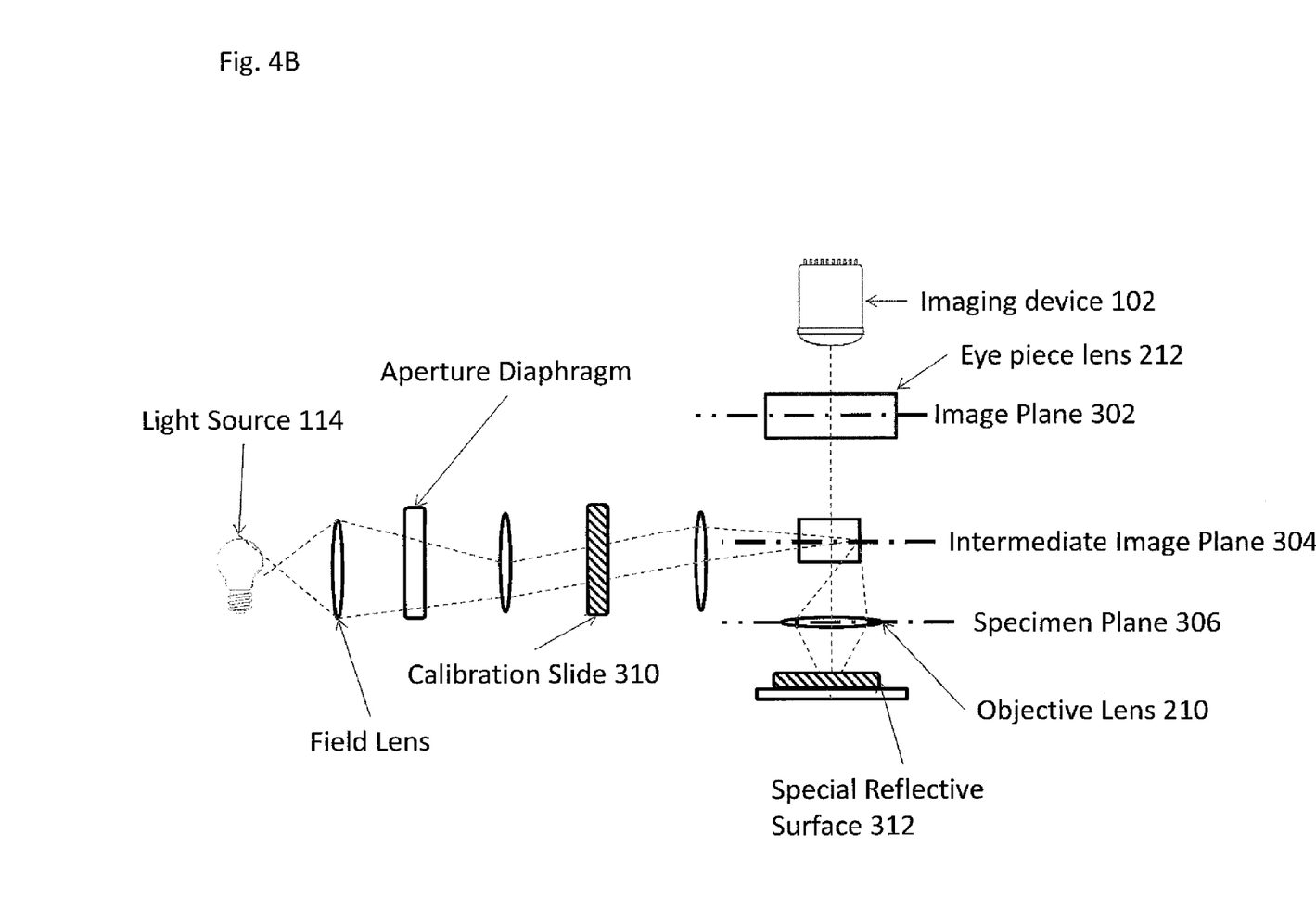
FIG. 4B is an illustrative diagram of the optical train of a reflecting microscope according to a further embodiment of the system described in FIG. 3A.
Figure 5:
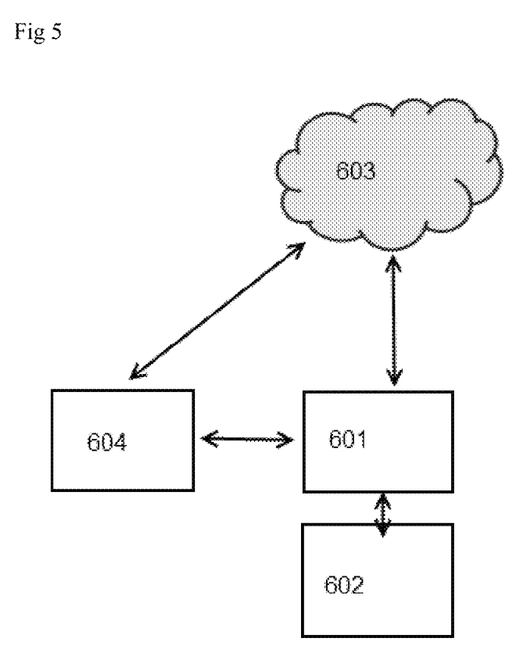
FIG. 5 is an illustrative diagram the computer system of the present invention.

The principles behind the present invention are applicable to, and can be used in conjunction with, multiple types of microscopes. For example, the illustrated arrangement in FIG. 1 employs a transmission microscope. However, the present system and method are also applicable to a reflectance microscope, as illustrated in FIGS. 4A-B Furthermore, those skilled in the art will recognize that the principles behind the present invention can be used with additional microscope types not disclosed but whose operational principals are understood.

Figure 1:
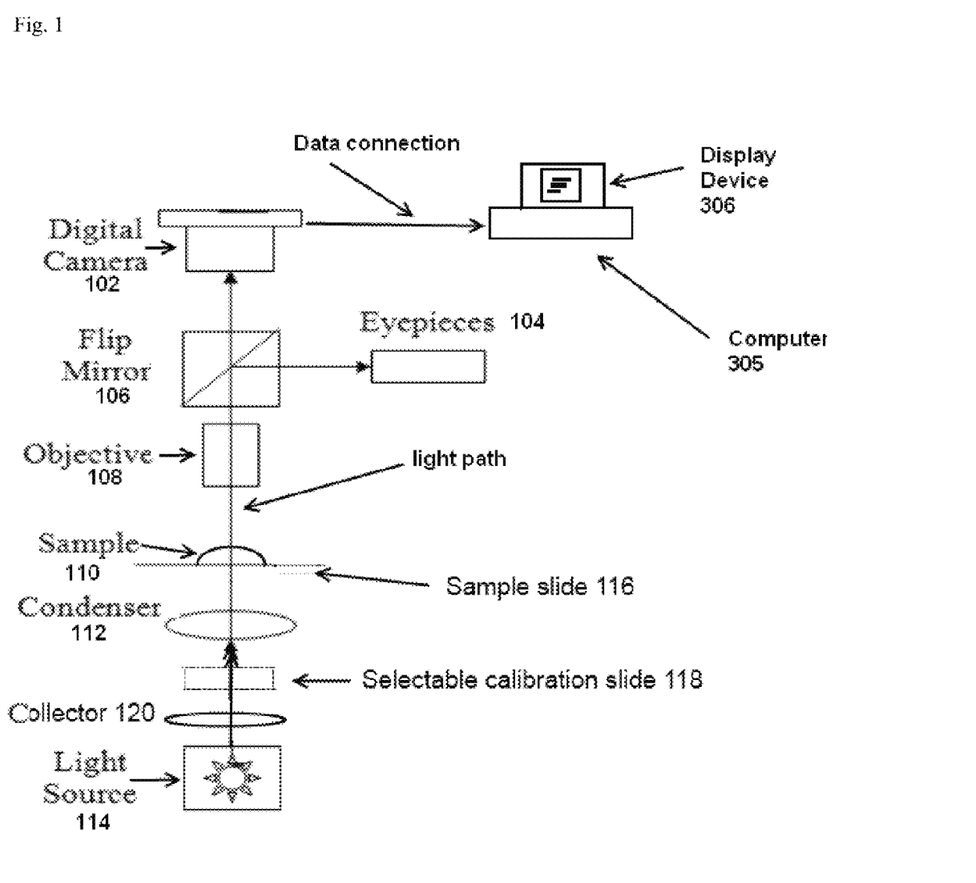
FIG. 1 is an illustrative diagram of the microscope system described herein.

As illustrated in FIG. 1, a transmission microscope is a device or apparatus in which the light source and the viewer are on opposite sides of the plane of the slide/specimen, and in which transmitted light is passed through the specimen. The light is transmitted to an eyepiece or image recording device designed to record images of the sample. When using a transmission microscope, those images are, for each spatial point, the product of the incident illumination of the light source and the transmittance spectrum of the specimen.

FIG. 1 illustrates an imaging device 102, e.g., a digital camera, configured to record images of a slide 116 in the transmission microscope. The light directed from the light source 114 is conditioned by a collector lens 120 and a condenser lens 112 and illuminates the sample 110 on the slide 116. The objective lens 108 collects the light (shown as a light path arrow) passing through the sample 110 and delivers that light to either the eyepiece 104 or imaging device 102, through a flip mirror 106. The imaging device 102 is configured to output the images to a processor, such as a computer 305. The computer 305 is optionally equipped with an output device 306, such as a calibrated monitor.

In the illustrated arrangement, the imaging device 102 is a CCD (Charged Coupled Device) or CMOS (Complementary metal-oxide-semiconductor), having sufficient components to record images to a temporary or permanent storage device. In a specific arrangement, the CCD sensor of the imaging device 102 is a ⅓" frame pixel recording device. In one arrangement, the imaging device is configured to record images having at least three (3) independent color channels (tri-chromatic characteristics).

The imaging device 102 is also configured to transmit recorded images to the computer 305 for analysis or processing. Those skilled in the art will appreciate that the data connection between the imaging device 102 and the computer 305 is any standard wired or wireless connection. For example, the imaging device 102 and the computer 305 of FIG. 1 are connected via a data cable. However, in an alternative arrangement of elements, the data connection is supplied by a local area network (LAN) or short range wireless network using protocols such as Wi-Fi, Bluetooth, or RFID.

The imaging device 102 is any device capable of capturing the required spectral data in sufficient detail necessary for the calibration functions to proceed. For example, a digital still camera, digital motion picture camera, portable computer camera, desktop computer camera, PDA equipped with a camera, an imaging device of a smart-phone, a camera phone, a web camera, and so on, having sufficient resolution for capturing color information, are suitable imaging devices. Likewise, any device may be used as an imaging device so long as it is capable of capturing optical data through a lens or plurality of lenses, and transmitting an image file that includes the captured data. As one non-limiting example, a digital single lens reflex camera and microscope adaptor form a suitable image capture device.

In the given arrangement of FIG. 1, the light source 114 is an incandescent light source, such as a halogen-based light source. In an alternative arrangement, the light source 114 is formed of multiple elements, each capable of providing a steady source of specific spectrum illumination, such as ultraviolet, infrared, daylight, tungsten light, fluorescent light, or other specific visible light spectra. Further, the light source 114 is positioned such that the reference illuminations emitted by the light sources 114 are incident upon the microscope stage and the slide 116 itself. In an alternative embodiment, these light sources are actively filtered so as to produce specific illumination characteristics.

As seen in FIG. 1, a selectable calibration slide 118, shown in dashed lines, is also used in the present transmission microscope to generate the necessary calibration values. In the illustrated arrangement, the calibration slide is not engaged in the optical train and the light emitted from the light source 114 is not incident upon it, but can optionally be engaged when the sample slide 116 is removed. In the illustrated arrangement the calibration slide 118 is a composite color filter array of known transmittance colors. The calibration slide, when introduced into the optical train, is positioned so that it is available to be directly illuminated by the light source (See FIG. 3B).

Figure 2:
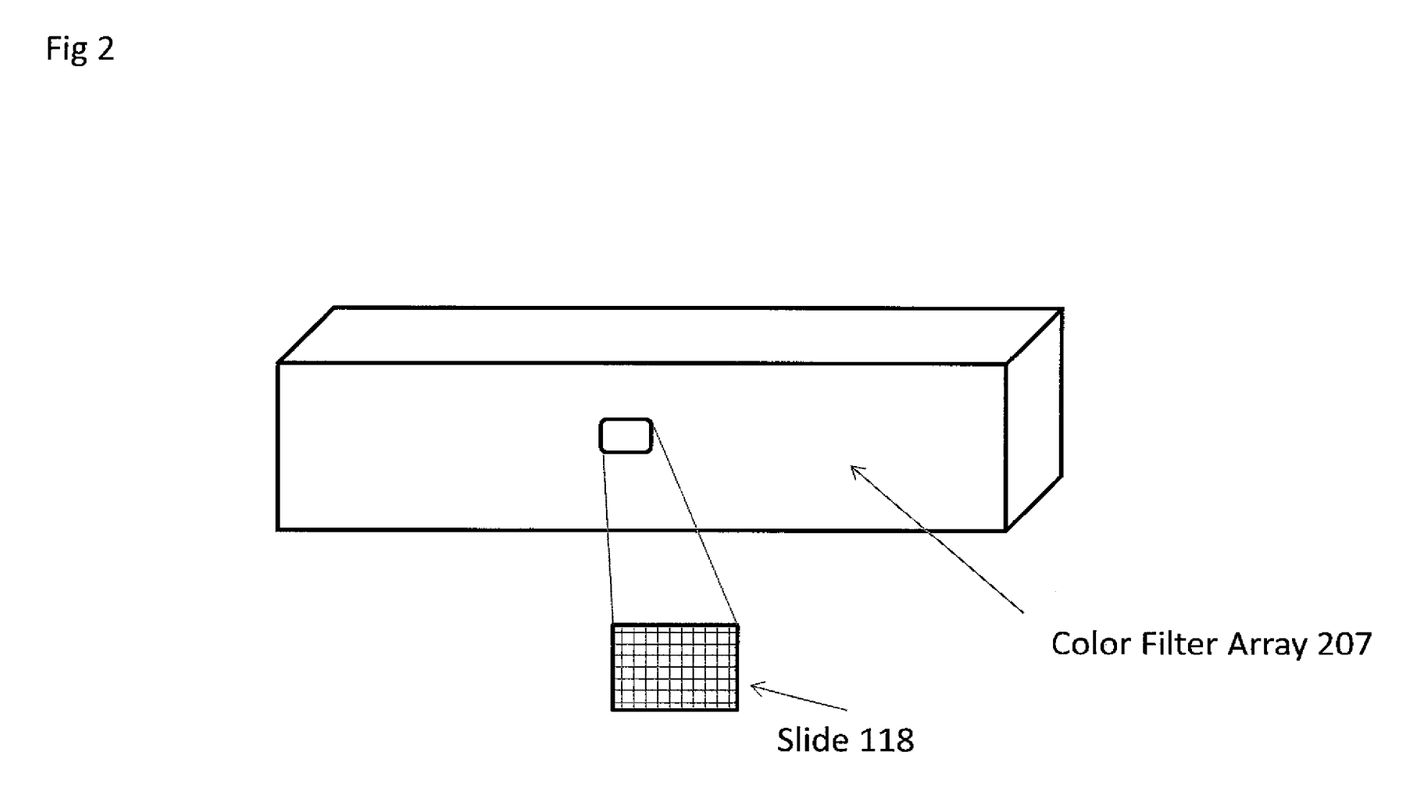
FIG. 2 is an illustrative diagram of the calibration slide of the present invention.

As shown in FIG. 2, in one arrangement of the calibration slide 118, the included color filter array is a grid 207. However, those skilled in the art will appreciate that other specific geometries of the color calibration arrays are within the scope of the present invention.

In a further arrangement, the color filter array 207 of the calibration slide 118 contains a plurality of sections with different transmission spectra necessary to replicate the complete range of transmission spectra likely to appear in the slide image. In the preferred embodiment, at least one portion of the array contains achromatic (black, white and grey) elements. In a further preferred embodiment, the surfaces of the transmission calibration samples are substantially uniform across the surface of the sample. In this way, microscopic magnification of non-uniform surface features of the calibration samples is minimized. Thus, transmission microscope surfaces permit calibration samples with a greater degree of surface uniformity, and hence greater color precision.

The color filter array 207 of the microscope calibration slide 118 is affixed through standard production techniques. For example, the color filter array 207 is printed onto the slide substrate by photolithographic printing or other similar techniques. In one arrangement, the color filter array 207 contains a plurality of color elements with different transmission spectra that, when combined, provide a complete coverage of the visible spectrum. While the color filter array 207 is depicted within the center of the calibration slide 118, it is possible to position the color array at any position on the slide substrate that is visible to an imaging device 102 or manual reviewer observing through the eyepiece 104.

In the described system, the specific transmission characteristics (such as transmission percentage at each wavelength for a variety of settings of the microscope numerical aperture) of each element of the color filter array is known and stored within a database accessible by the computer 305. The calibration slide 118 is formed of standard optical slide materials that are commercially available for the given purpose. The calibration slide 118 is composed of any suitable material for inclusion with the given microscope type. For example, the calibration slide 118 is composed of glass, plastics, composite materials, and other standard transparent materials used for transmission microscopy slide production. The calibration slide 118 is formed of material suitable for photolithography. Such photolithography based slides are composed of materials that are commonly used in the art for photolithography techniques. Alternatively, those skilled in the art will appreciate that the array elements can be fused (using optical glue) to a regular microscope slide.

The calibration slide 118 is configured for easy and safe insertion into and removal from the optical train of the microscope. For example, calibration slide is secured within a cartridge or holder (not shown), that allows the calibration slide to be positioned without physical handling of the calibration slide.

Transmission Microscope

Figure 3A:
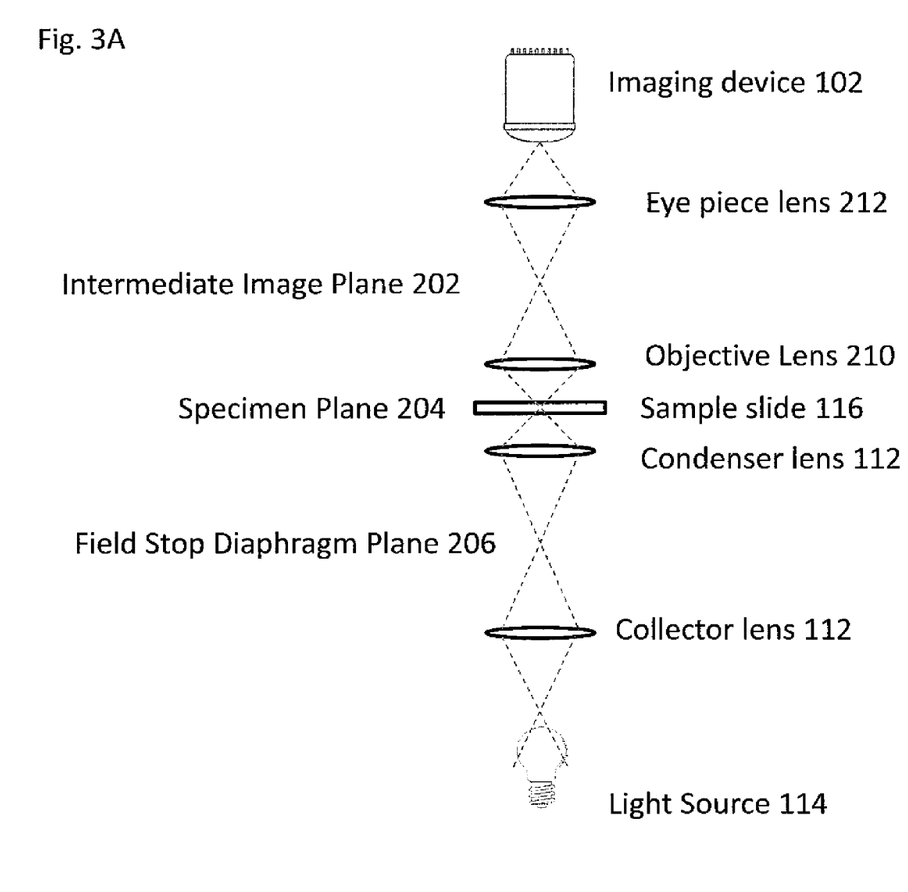
FIG. 3A is an illustrative diagram of the optical train of a transmission microscope according to a particular embodiment of the present invention.

FIG. 3A illustrates in greater detail the optical train of a transmission microscope 100 during sample analysis and imaging. As shown, the light from the light source 114 travels through the optical train, to reproduce a sharp focused image of a specimen at either the eye-piece or the image recording device 102. FIG. 3A further illustrates the conjugate field focal planes (202, 204, 206) of a transmission microscope. The microscope and image recording device 102 have at least one image setting selector used to obtain an image of a sample, e.g. a configurable numerical aperture with a plurality of pre-set positions. Those skilled in the art will appreciate that there are a variety of image settings selector that are adjustable to obtain a suitable image. Each of these settings are pre-configurable, automatically or manually adjustable during the imagining operation.

Figure 3B:
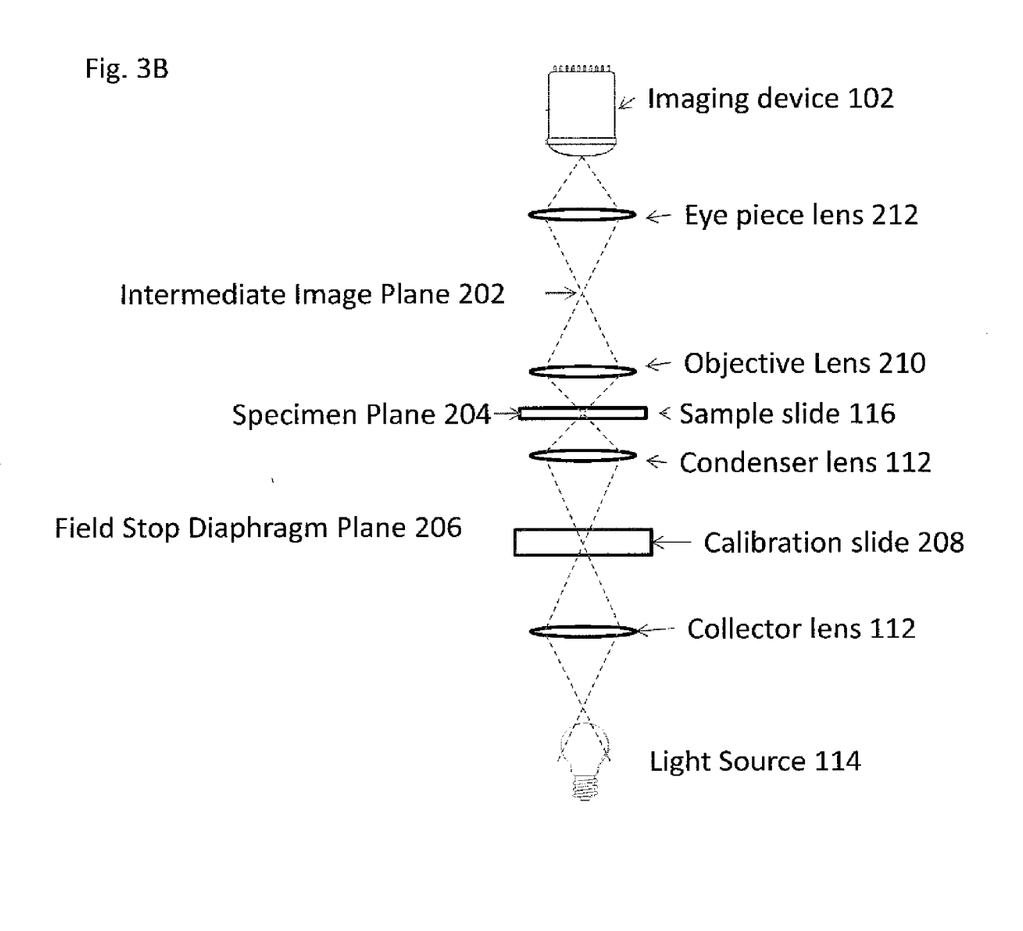
FIG. 3B is an illustrative diagram of the optical train of the microscope according to a further embodiment of the system described in FIG. 2A.

When the sample 208, secured to a sample slide 116 positioned at the specimen plane 204 is in focus, there exist several positions along the optical train 201 in which the image of the sample is also in focus. These locations are commonly referred to as conjugate field planes. In the illustrated optical train, when the sample 108 under analysis is in sharp focus, the Field Stop Diaphragm plane 206, and the intermediate image plane 202 are also in sharp focus As shown in FIG. 3B, when a user calibrates the images taken of the sample slide 116, the calibration slide is introduced into the optical train. The calibration slide 208 is inserted into the optical train at one of the conjugate plane locations (202, 204 or 206) such that the light transmitted through the calibration slide 208 is in focus at the eyepiece/camera aperture 102. The image setting values used to obtain the desired sample image are kept static and without adjustment For example, the numerical aperture setting value used to obtain the sample image is used, without modification, to obtain the calibration image. microscope or camera. In the illustrated arrangement, the calibration slide is configured with an insertion mechanism that allows the slide to be inserted into the desired conjugate plane. In an alternative arrangement, the optical train of the microscope is equipped with a plurality of calibration slide ports that allow the insertion and withdrawal of a transmission slide.

As seen in FIG. 3A and 3B, the transmission calibration slide 208 or the specimen slide 116 is set into the optical path of the transmission microscope. When the calibration slide 208 is inserted into the optical train, the specimen/object slide 116 is removed from the optical train so as to allow light from the light source to transmit through the calibration slide 208 directly to the eyepiece 104 or image recording device 102. Those skilled in the art will appreciate that each of the slides can be configured for automatic or manual insertion and retraction. For example, the specimen slide 116 and the calibration slide 208 are each positioned on retractable or selectable slide mounts (not shown). Upon focusing on the object slide, a user manually, or via remote control, actuates the selection of a slide, placing the calibration slide 208 into the optical train. Upon selection of the calibration slide 208, the specimen slide is retracted.

Those skilled in the art will quickly appreciate the potential arrangement of elements in order to accomplish the substitution of an object slide for a calibration slide. For example, a plurality of retractable slide mounts connected to a processer, executing code therein, can be configurable to activate and insert a given slide into the optical train depending on user input. Regardless of the mechanism of selection or substitution, the focal planes of the optical train are not altered. As such, so long as a calibration slide is placed in a conjugate field as described above, the calibration slide remains in focus.

In a further arrangement of the system described, the user selects to record an image of a specimen. After the user or computer has set the microscope and image recording settings, a computer automatically obtains an accurate color calibration measurement by automatically withdrawing the specimen slide and inserting the calibration slide into one of the conjugate planes. In one arrangement, the calibration slide is incorporated into a portion of the optical train that allows the calibration slide to be inserted into the field stop diaphragm conjugate plane 206. Alternatively, the optical train of the present invention is configured to give access at each of the conjugate planes. In this arrangement, a user manually inserts the calibration slide or slide housing.

In a further arrangement, a selectable mirror is configured for insertion into the optical train. In this arrangement, a second optical train is provided with a fixed or selectable calibration slide. Upon activation of the selectable mirror, the second optical train provides a sharp focus image of the calibration slide to the imaging device without changing of the settings of the microscope or camera. In this arrangement, both optical trains are configured such that the altering of the settings of one optical train is conveyed to the second optical train.

Reflection Microscope

In an alternative arrangement, the microscope used in the present system and method is a reflected light microscope. FIGS. 4A and 4B illustrate the an optical train for a reflection microscope. In the illustrated arrangement, the calibration slide 310 is a transmission calibration slide as opposed to a reflective calibration slide. Those skilled in the art will appreciate that because light passes through the conjugate planes of the optical train of a reflection microscope after it has been reflected, there is no position available for reflecting the light off the calibration slide.

Similar to a transmission microscope, the conjugate planes of a reflecting microscope allow for the insertion of the calibration slide wherever a focused image would be obtained, if the specimen were in focus. Like the transmission microscope, in the reflected microscope the suitable phase conjugate planes are at the field stop diaphragm 308, the specimen plane 306, and the intermediate image plane 304, as well as at the image plane 302. As shown in FIG. 4A, when a sample is under analysis, the calibration slide 310 is not inserted into the optical train. Once calibration of the image is desired, the calibration slide 310 is inserted into one of the conjugate planes of the reflected microscope (FIG. 4B).

As shown in FIG. 4B, in a reflection microscope a special reflecting surface 312 is substituted for the test or specimen slide 116. In the case of a bright-field reflected-light microscope (in which the lighting angle is close to 90 degrees), a flat mirror is used as the special reflecting surface 312 in order to counteract optical imperfections of a diffuser that can be accentuated by the 90 degree light angle. In an alternative arrangement, in a dark-field reflected-light microscope (in which light is incident from a substantial angle), a diffuser such as an opal glass is employed as the special reflecting surface 312. Those skilled in the art will appreciate that any optical element that returns light to the optical path in the specular direction may be used In one arrangement, the user manually arranges for both the calibration slide and the reflecting surface to be arranged in their proper positions. In an alternative arrangement, a computer, or computer directed device automatically arranges both the calibration slide and the special reflective surface. For example, in one arrangement of a reflected-light microscope of the present invention, a flat mirror (for bright field reflection) is automatically positioned within the specimen plane simultaneously with the positioning of the calibration slide. Alternatively, a user is informed upon selection of a dark field reflected light microscope action to insert a diffuser into to the specimen plane prior to attempting to obtain an accurate color calibration measurement.

Since the calibration slide is at the conjugate plane of the specimen plane, the calibration slide will be automatically focused. No other camera or microscope setting needs to be adjusted as these will invalidate the color calibration. One can then take a picture of the calibration slide and move it out of view and move the specimen slide back for further image capturing. In one arrangement, control of the slide position and the color calibration module are integrated into the microscope control software.

The present invention is configured to transmit the transmission color data directly to a local computer system 601 through physical or wireless connections. See FIG. 6. As an alternative embodiment of the present invention, it is possible to configure the transmission data, such as tristimulus color data, for transmission to a remote processing computer system or cloud based computer system 603. For example, it is possible to transmit the calibration values from the imaging site to a local computer system which in turn offloads the processing duties to a cloud-based processing appliance. The local computer is further configured to possess a database wherein reference transmission values are stored.

Once the imaging processing has been completed, the color corrected image can be sent to the calibrated display device 602 attached to local computer 601. The present invention can be configured so as to allow display devices, such as computer monitors and projection devices, to be calibrated through external calibration systems such as Spyder® calibration devices, or by using color information from the processed images themselves. In an alternative embodiment, the color corrected image is sent directly to a printer configured to accept the image file. In such an embodiment a monitor is not necessary. The printer can be any standard or customized printing device, in a standard state of calibration.

It is further expected that the computer system 601 is fully capable of connecting to external and internal networks so as to distribute processing tasks or exchange data imbedded within each slide. The computer system can connect to networks and databases using commonly understood programming interfaces and interface modules, e.g., Media Server Pro, Java, Mysql, Apache, Ruby on Rails, and other similar application programming interfaces and database management solutions. The remote analysis system 603 of the present invention is characterized, in part, by its broad adaptability to user configurations, multiple user inputs, and hardware configurations.

The remote analysis system 603 can also accessed by way of a web portal, e-mail, or text message. The computing device is capable and configured to receive industry standard telecommunications for data transfer. Furthermore, the computing system is capable of parsing telephone, e-mail, and other header data so as to enable a return message to be sent to a user by means of conventional protocols as is commonly known (e.g., using the Automatic Number Identification (ANI) in a telephone call set-up, or sender address information in an email). The remote analysis system can be connected to in a conventional manner, such as by using a web browser program such as Mozilla's Firefox. The web portal offers the ability to transmit data from non-networked sources such as digital cameras, web camera, and digital tape feed.

The present invention also incorporates a methodology for using the system so described to carry out and achieve the function of providing a color calibrated image to a display. Such a method involves, but is not limited to, a securing step, wherein the object or sample is affixed to a sample slide. The method also includes a recording step in which a plurality of images of the sample slide are recorded under a plurality of different lighting schemes and illuminations. A calibration selection step is also involved wherein the sample slide is removed from the microscope optical train and the microscope calibration slide is inserted into the optical train. A second recording step is then provided, wherein a plurality of images of the calibration slides are recorded under a plurality of different lighting schemes and illuminations. Next a calibration step is provided, wherein the poly-stimulus values of the images of the calibration slide are used to estimate the proper color and transmission values of each pixel of the sample slide images For example, the calibration calculation processes as described in U.S. Ser. No. 13/211,875 are implemented with the described invention. Finally there is an output step wherein a calibrated image is generated with the proper color and is then provided in electronic file format ready for storage or transmittal to a display device.

The above processing functions can operate as a series of programmed steps performed by a properly configured computer system using one or more modules of computer-executable code. For instance, a set of software modules can be configured to cooperate with one another to provide accurate color reproduction information to a display device as described herein. In this regard, there can be an imaging module, a slide selection module, a data collection module, a calibration module, and an output module.

The imaging module can be configured as a series of discrete sub-modules designed to access optical data from a digital image capture device and convert that data into a format suitable for individual pixel analysis. The imaging module incorporates functions enabling the present invention to record a set number of images, change illuminants, configure recording resolution and alter built-in or other color filters.

The slide selection module can be configured as a series of discrete sub-modules designed to inset or retract calibration slides, object slides and reflective surfaces from the optical train.

A data collection module can be configured as a series of discrete sub-modules designed to access the integral color target data located on the microscope slide, access reference color and illuminant data located in a remote access database, and record unique identifier information embedded within the slide.

The calibration module can be configured as a series of discrete sub-modules providing the present invention with the necessary functionality to extract color value data from the image pixels, compare extracted color values against a database of reference color values, and transform the extracted pixel color values to conform to reference values.

The output module can be configured as a series of discrete sub-modules designed to provide functionality to the present invention. The discrete sub-modules could include instructions for combining the transformed pixels into a composite image, transmitting images to a display device, formatting images for a particular display device and updating a database of reference images and stored images.

Each of these modules can comprise hardware, code executing in a processor, or both, that configures a machines such as the computing system 601 to implement the functionality described herein. The functionality of these modules can be combined or further separated, as understood by persons of ordinary skill in the art, in analogous implementations of embodiments of the invention.

While the invention has been particularly shown and described with reference to a preferred embodiment thereof, it will be understood by those skilled in the art that various changes in form and details may be made therein without departing from the spirit and scope of the invention.

What is claimed is:

1. A system for correcting the color of microscope images for different illuminants, comprising:
    a microscope having:
    at least one image setting selector with a plurality of pre-set values;
    a housing defining an optical train, the housing having a distal end and a proximal end, said optical train being configured to convey illumination the optical train having a sample image plane and a plurality of conjugate image planes, the housing configured to receive a selectable microscope calibration slide at one or more of the conjugate plane locations wherein the image produced at the conjugate plane is of a lower magnification than an image obtained at the image plane;
    an illumination source configured to direct illumination into the distal end of the optical train;
    a selectable sample slide securing a sample to be analyzed and configured for insertion into the optical train at the sample plane;
    a selectable microscope calibration slide, integral to the microscope at a conjugate plane of the sample plane and configured to be inserted or withdrawn from the field of view of the microscope without being removed from the microscope, the microscope slide further having an integral transmission filter array of known transmission spectra for each value of the image setting selector;
    an image recording device, configured to record a least one sample image of the sample slide a using a pre-set image setting selector value while the sample slide is inserted in the optical train at the sample plane, and at least one calibration image of the microscope calibration slide using the same pre-set image setting selector value while the calibration slide is inserted at a conjugate plane of the sample plane and the sample slide is withdrawn from the optical train, and each image is comprised of a pixel array with each pixel having a color value.

2. The system for correcting the color of microscope images as in claim 1, further comprising an image processor, configured by code executing therein, to:
    extract color value information from the pixel array of each of the plurality of images;
    transform the color value of each pixel to conform to reference color values; and
    output a composite image wherein the color values of each pixel have been transformed based on the reference color values.

3. The system for correcting the color of microscope images as in claim 1, wherein the microscope is a reflection type and further comprising a reflective surface positioned within the sample plane contemporaneous with the introduction of the calibration slide.

4. The system for correcting the color of microscope images as in claim 3, wherein the reflective surface is opaque.

5. The system for correcting the color of microscope images as in claim 3, wherein the calibration slide is transmissive.

6. The system for correcting the color of microscope images as in claim 3, wherein the microscope is a dark-field microscope.

7. The system for correcting the color of microscope images as in claim 6, wherein reflecting surface is diffusive.

8. The system for correcting the color of microscope images as in claim 3, wherein the microscope is a bright-field microscope.

9. The system for correcting the color of microscope images as in claim 8, wherein the reflecting surface is diffusive.

10. The system for correcting the color microscope images as in claim 2, wherein the image processor is connected to an output device configured to display the composite image.

11. The system for correcting the color of microscope images as in claim 1, wherein the calibration slide is composed of a slide substrate and a slide cover, and the plurality of color filters are integral to the slide substrate or slide cover.

12. A method for managing the color on microscope images comprising:
    recording at least one focused image of a sample secured to a slide at a sample plane under at least one lighting condition;
    extracting from the at least one image, data points relating to color values of individual image pixels of the sample slide;
    removing the sample slide from the field of view of the microscope; positioning a calibration slide, integral to the microscope and positioned at a conjugate plane of the sample plane, into the field of view of the microscope;
    recording at least one image of the calibration slide under said at least one lighting condition;
    extracting from the plurality of images data points relating to color values of individual image pixels of the calibration slide;
    calibrating the data points of the sample slide to conform to the data points of the calibration slide;
    transforming the pixels of the sample slide to reproduce a corrected image with calibrated color values; and
    outputting the corrected image to a display device or storage device.

13. The method for managing the color on microscope images of claim 12, wherein the microscope is a reflectance type and further comprising the step of:
    inserting a reflective surface into the sample plane of the optical train when inserting the calibration slide into the optical train.

14. The system for correcting the color of microscope images as in claim 2, wherein the color values of the color filter array are calculated from the known transmission spectra determined by the image setting value, a spectral power distribution of the destination illuminant and two-degree Comission Internationale de l'Eclairage (CIE) color matching functions.

15. A computer-implemented method for utilizing a particular connection with an electronic device combining a microscope equipped with at least one calibration port positioned at a conjugate plane of the sample plane at a given image setting value, at least one sample secured to a sample slide, at least one calibration slide with an integral color filter array, a digital imaging device and an imaging processor, the imaging processor equipped with a memory storage device and configured to execute code for transforming the color values of pixels of an image recorded by the imaging, comprising the steps of:

recording at least one focused image of a sample secured to a slide under at least one lighting condition;
  extracting from the at least one image, data points relating to color values of individual image pixels of the sample slide;
  removing the sample slide from the field of view of the microscope;
  inserting a calibration slide integral to the microscope and positioned at a conjugate plane of the sample plane into the field of view of the microscope where the conjugate plane produces an image at a lower magnification than the sample plane;
  recording at least one image of the calibration slide under at least one lighting condition wherein the image includes the complete color filter array;
  extracting from the plurality of images data points relating to color values of individual image pixels of the calibration slide;
  calibrating the data points of the sample slide to conform to the data points of the calibration slide;
  transforming the pixels of the sample slide to reproduce a corrected image with calibrated color values; and
  outputting the corrected image to a display device or storage device.

16. The computer-implemented method of claim 15, wherein the microscope is of the reflection type and further comprising the step of, inserting a reflective surface into the sample plane of the optical train when inserting the calibration slide into the optical train.

* * * * *